United States Patent [19]
Joyner

[11] Patent Number: 5,659,640
[45] Date of Patent: Aug. 19, 1997

[54] INTEGRATED WAVEGUIDE HAVING AN INTERNAL OPTICAL GRATING

[75] Inventor: Charles H. Joyner, Middletown, N.J.

[73] Assignee: Lucent Technologies Inc., Murray Hill, N.J.

[21] Appl. No.: 495,281

[22] Filed: Jun. 27, 1995

[51] Int. Cl.$^6$ ................................................. G02B 6/124
[52] U.S. Cl. ............................ 385/14; 359/575; 385/131
[58] Field of Search ....................... 385/14, 37, 129–131; 359/566, 569, 570, 574, 575, 576

[56] References Cited

U.S. PATENT DOCUMENTS

| | | | |
|---|---|---|---|
| 4,763,972 | 8/1988 | Papuchon et al. | 385/129 X |
| 4,902,643 | 2/1990 | Shimawaki | 437/89 |
| 4,910,164 | 3/1990 | Shichijo | 437/90 |
| 5,029,981 | 7/1991 | Thompson | 385/130 X |
| 5,049,522 | 9/1991 | Stanchina et al. | 437/62 |
| 5,170,460 | 12/1992 | Arvidsson et al. | 385/129 |
| 5,227,915 | 7/1993 | Grossinger et al. | 359/575 X |
| 5,256,594 | 10/1993 | Wu et al. | 437/89 |
| 5,288,657 | 2/1994 | Feygenson et al. | 437/90 |
| 5,352,919 | 10/1994 | Takano | 257/431 |
| 5,369,722 | 11/1994 | Heming et al. | 385/130 |
| 5,418,183 | 5/1995 | Joyner et al. | 437/129 |
| 5,511,142 | 4/1996 | Horie et al. | 385/129 |

FOREIGN PATENT DOCUMENTS 62-173403  7/1987  Japan .................................. 359/575

OTHER PUBLICATIONS

"A Multifrequency Waveguide Grating Laser By Selective Area Epitaxy", C. H. Joyner et al., *IEEE Photonics Technology Letters*, vol. 6, No. 11, Nov. 1994, pp. 1277–1279.

"Selective Organometallic Vapor Phase Epitaxy of Ga and In Compounds: A Comparison of TMIn and TEGa versus TMIn and TMGa", C. Caneau et al., *Journal of Crystal Growth*, vol. 132, pp. 364–370, Sep. 1993.

"Extremely Large Band Gap Shifts for MQW Structures by Selective Epitaxy On $SiO_2$ Masked Substrates", C. H. Joyner et al., *IEEE Photonics Technology Letters*, vol. 4, No. 9, Sep. 1992, pp. 1006–1009.

*Integrated Optics* Springer–Verlag, Edited by T. Tamir, pp. 62–66, 1979. [No Month].

*Primary Examiner*—John D. Lee
*Attorney, Agent, or Firm*—Stuart H. Mayer

[57] ABSTRACT

A method for forming an optical grating within a waveguide integrated on a substrate includes the step of depositing on a substrate successive layers of material constituting a waveguide such that the waveguide has a periodically varying width along a portion of its longitudinal axis. The deposition may be accomplished by depositing by selective area epitaxy at least some of the successive layers through a mask having a periodically varying width along at least one edge. The successive layers deposited through the mask may constitute a plurality of quantum well layers separated from each other by barrier layers which collectively form a multiple quantum well stack.

39 Claims, 2 Drawing Sheets

INTEGRATED WAVEGUIDE HAVING AN INTERNAL OPTICAL GRATING

FIELD OF THE INVENTION

This invention relates to an epitaxial growth method for forming waveguides, and more particularly to an epitaxial growth method employing selective area epitaxy to form a waveguide that incorporates an optical grating.

BACKGROUND OF THE INVENTION

Photonic integrated circuits are typically comprised of a plurality of photonic devices, located on a semiconductor substrate, that are in optical communication with one another. Most methods for creating photonic integrated circuits involve forming one photonic device at a time. This is due to an inability to regionally vary the bandgap of the quantum well (QW) material being deposited in a given epitaxial growth.

In the methods noted above, the epitaxial layers required to form a first type of photonic device, such as a laser, are grown over the whole substrate. The growth times and source material concentrations used for the growth are selected so that the quantum well (QW) material that is deposited has the requisite characteristics, i.e., band gap, to function as the desired device. The layers are then masked at the region where the first photonic device is desired. Subsequently, the layers in unprotected regions are etched away where other devices, such as modulators or waveguides, are desired. After etching, layers corresponding to a second type of photonic device are grown on the substrate in the etched regions. Growth conditions are adjusted for the second growth so that the QW material exhibits the appropriate band gap. If a third type of photonic device is desired, the layers are again masked and etched, conditions are adjusted and a third series of epitaxial layers are grown in the etched region.

Methods that utilize successive growths as described above may be collectively referred to as "etch and regrow" methods. Etch and regrow methods prevent devices such as lasers or other active elements from being fabricated at the same time and in the same optical plane as other devices such as waveguides and optical gratings because such devices require QWs with different bandgaps. Moreover, devices grown from the etch and regrow method frequently exhibit poor optical interface quality between different devices, which can result in internal reflections and coupling losses.

Selective area epitaxy (SAE) is an epitaxial growth method that minimizes the poor optical interface problems associated with the etch and regrow method. Using SAE, the bandgap of QW material can be varied in the same plane with a single growth. Thus, layers defining various photonic devices can be grown simultaneously. See Joyner et al., "Extremely Large Band Gap Shifts for MQW Structures by Selective Epitaxy on SiO$_2$ Masked Substrates," IEEE Phot. Tech. Lett., Vol. 4, No. 9 (Sept. 1992) at 1006–09 and Caneau et al., "Selective Organometallic Vapor Phase Epitaxy of Ga and In Compounds: A Comparison of TMIn and TEGa versus TMIn and TMGa," J. Crystal Growth, Vol. 132 (1993) at 364–70, which are both hereby incorporated by reference.

In the SAE method, dielectric masks, such as SiO$_x$ or SiN$_x$, are deposited on a substrate. Such masks typically comprise two strips spaced to form a gap. Source material for forming the epitaxial layers, such as indium (In), gallium (Ga), arsenic (As), and phosphorus (P), is typically delivered via a technique such as metalorganic vapor phase epitaxy (MOVPE).

Source material arriving from the vapor phase will grow epitaxially in regions where the mask is open, i.e, the substrate is uncovered. Source material landing on the mask itself will not readily nucleate. Given the proper temperature and mask width, most of the source material that lands on the mask reenters the vapor phase and diffuses, due to the local concentration gradient, to find an unmasked region.

Compared to a completely unmasked substrate, the QW growth that occurs in the gap for both InGaAs and InGaAsP epilayers will be thicker, and richer in indium. This effect is due to the relative diffusion coefficients of In and Ga under typical MOVPE growth conditions. As the QW layers thicken, changes occur in the quantum confined Stark effect resulting in longer wavelength (lower energy band gap) QW material. Increasing indium content also results in longer wavelength QW material. Thus, from both the quantum-size effect and change in alloy composition, the QWs in the gap are shifted to lower energy band gaps than regions far from the mask. Accordingly, the refractive index of the QWs in the gap are increased relative to the regions outside the gap. By varying the ratio of the mask width to the gap width, the composition, and hence the bandgap and refractive index, of QW material can be varied. In U.S. Pat. No. 5,418,183, for example, a SAE method is employed to fabricate lasers and passive waveguides so that their respective QWs are located in the same plane of material.

However, when optical grating, waveguides and other active devices are fabricated together by etch and regrow techniques, they are either formed in different planes or with significant loss due to interfacial reflections in the plane of propagation.

SUMMARY OF THE INVENTION

The present invention provides a method for forming an optical grating internal to an optical waveguide. That is, the optical grating and waveguide are formed in the same layer of material and hence in the same plane. An active device such as a laser also may be fabricated at the same time and in the same layer.

In accordance with the present invention, a method for forming an optical grating within a waveguide integrated on a substrate includes the step of depositing on a substrate successive layers of material constituting a waveguide such that the waveguide has a periodically varying width along a portion of its longitudinal axis. The deposition may be accomplished by depositing by selective area epitaxy at least some of the successive layers through a mask having a periodically varying width along at least one edge. The successive layers deposited through the mask may constitute a plurality of quantum well layers separated from each other by barrier layers which collectively form a multiple quantum well stack.

The present invention also provides an integrated optical device that includes a substrate and a waveguide formed on the substrate. The waveguide has a periodically varying width and thickness along a portion of its longitudinal axis. The period may vary in an arbitrarily prescribed manner along the longitudinal axis. Alternatively, the period may be constant along the longitudinal axis.

BRIEF DESCRIPTION OF THE DRAWINGS

Other features of the present invention will be more readily understood from the following detailed description of specific embodiments thereof when read in conjunction with the accompanying figures in which.

DETAILED DESCRIPTION

Figure 1:
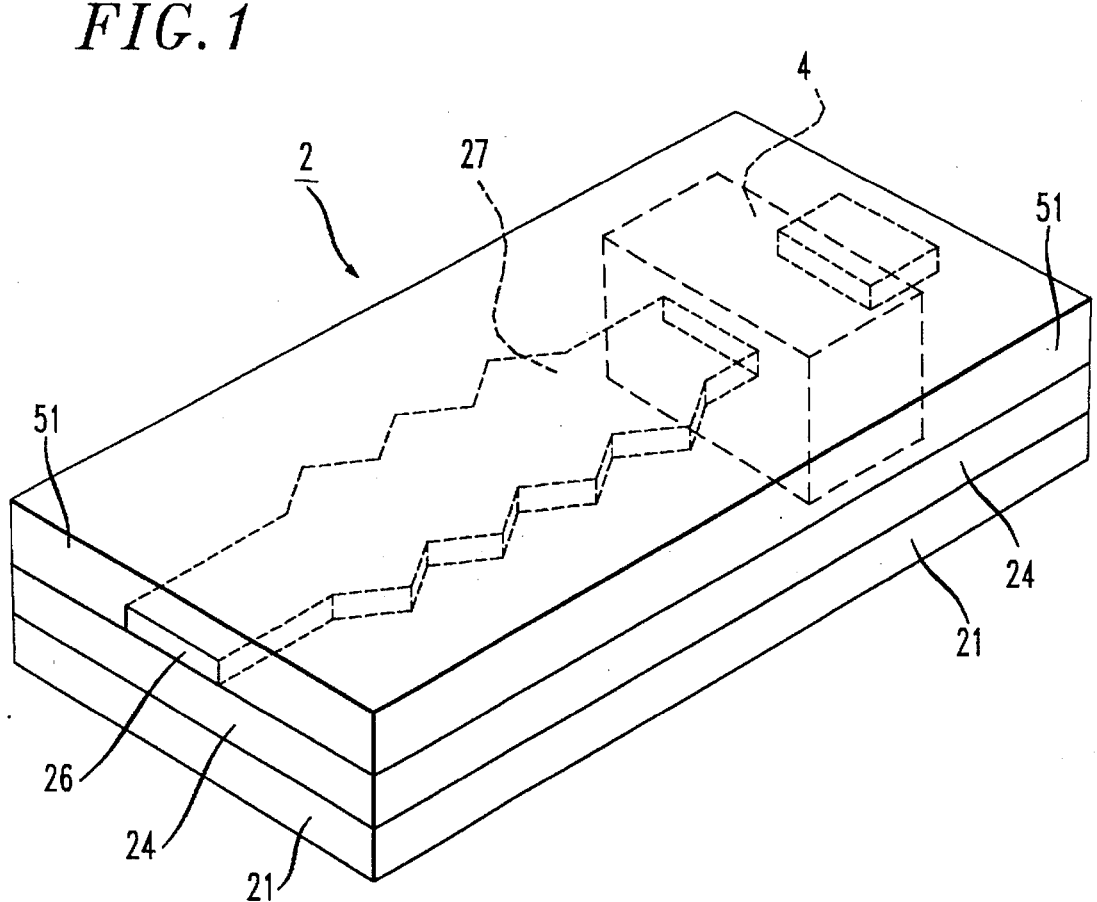
FIG. 1 is a simplified schematic diagram of a buried heterostructure waveguide constructed in accordance with the present invention.

While the present invention will be described in terms of an optical grating that is fabricated internal to a buried heterostructure waveguide such as shown in FIG. 1, one of ordinary skill in art will recognize that the present invention is equally applicable to the fabrication of gratings internal to other waveguide structures such as a strip-loaded waveguide, for example. A waveguide incorporating an optical grating may be used in a variety of devices and may serve, for example, as the grating in grating-coupled waveguides that are used in broadband filters.

In FIG. 1, the exemplary buried heterostructure waveguide 2 includes a substrate 21 on which a buffer layer 24 is fabricated. A multiple quantum well (MQW) stack 26 serving as the waveguide core is formed on the layer 24. The MQW stack 26 is buried in a cladding layer 51. As described in more detail below, an optical grating 27 is formed within the MQW stack 26. An active device 4 also may be fabricated on the substrate 21. The active device 4 may include any type of optically active structure, including, for example, lasers, modulators, switches, tunable filters, wavelength converters, and optical detectors. The waveguide 2 and active device 4 are fabricated in the same layer by SAE. A technique for fabricating a waveguide and active device in the same layer by SAE is shown in U.S. Pat. No. 5,418,183, which is hereby incorporated by reference, and hence will not be discussed further. The waveguide and active device may be covered with suitable layers that depend on the particular nature of the active device.

In accordance with the present invention, the buried heterostructure waveguide 2 is fabricated by the previously mentioned SAE method in which a mask is deposited on the layer 24 where the MQW stack 26 will be formed. By selecting an appropriately configured mask, the MQW stack 26 may be fabricated so that an optical grating 27 is contained therein.

Figure 2:
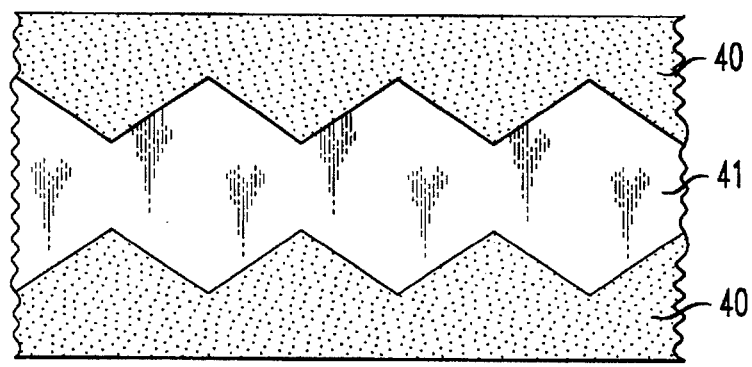
FIGS. 2–5 show top views of exemplary masks through which material may be deposited to fabricate the waveguide in accordance with the present invention.

FIG. 2 shows a top view of an exemplary mask 40 located over the substrate 21 and layer 24. In accordance with the present invention, the mask defines a periodic gap 41 through which the substrate is exposed. The mask is preferably formed of dielectric material, including, without limitation, $SiO_x$ and $SiN_x$, and in particular, $SiO_2$. The mask 40 can be made by any suitable method such as, without limitation, plasma-assisted chemical vapor deposition, electron beam vaporization or sputtering.

The material that will be patterned into the mask 40 is typically deposited to a thickness of about 3000 angstroms and then etched to create the desired mask configuration. The thickness of the mask 40 is advantageously about equal to the wavelength of the light used to expose the photoresist during photolithographic patterning. This results in an improvement in mask features, i.e., sharp edges, relative to other thicknesses.

The mask 40 comprises a pair of strips whose widths undergo periodic variations. In FIG. 2 these periodic variations are illustratively shown as a serration. The variations in the width of gap 41 mirrors the variation in width of the strips. The width of the two strips forming the mask 40 and the gap 41 must be sized so that the MQW material grown in the gap is suitable for forming a waveguide. For example, a low loss waveguiding layer having an effective bandgap of 1.3 microns (and an effective refractive index of 3.25) may be formed from a MQW stack 26 composed of alternating layers of InGaAsP barrier material 90 Å thick having a 1.3 micron band gap and InGaAsP quantum well material 50 Å thick having a bandgap of 1.6 microns. However, in those regions where the gap 41 is relatively narrow the effective bandgap may be about 1.4 microns or greater with an effective refractive index of 3.3 or higher.

Figure 3:
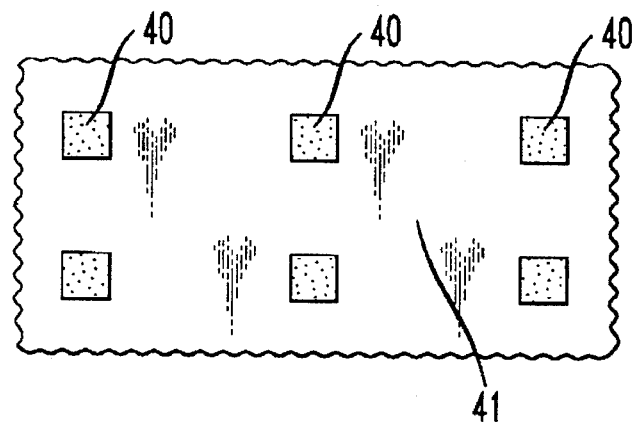
Figure 4:
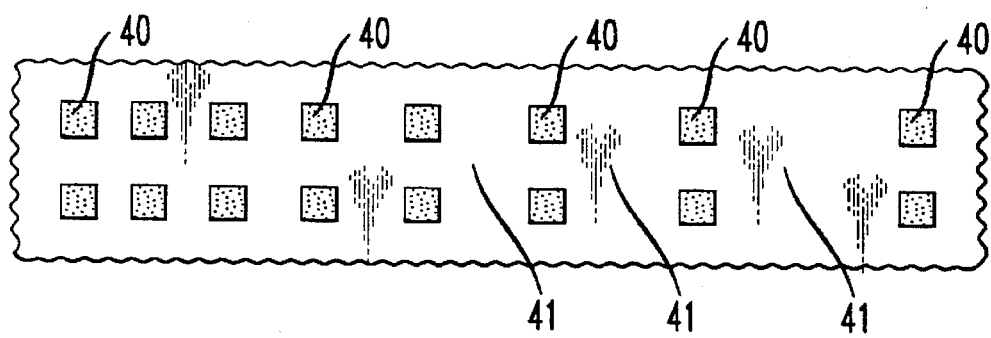
Figure 5:
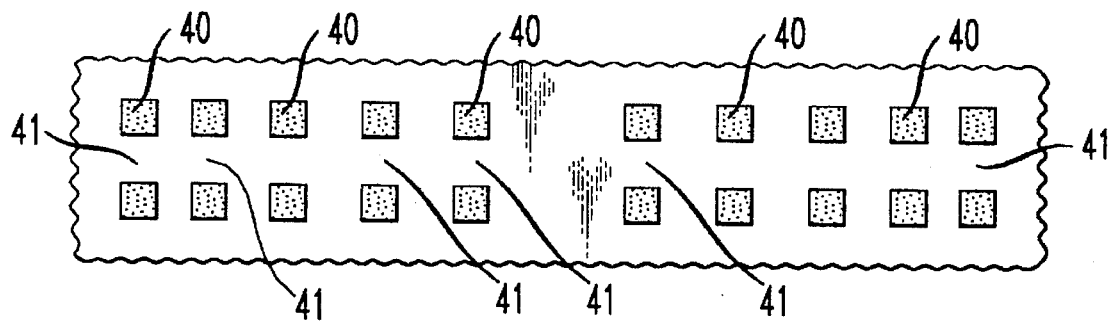

While the particular mask shown in FIG. 2 is formed from two serrated strips, other mask geometries are contemplated by the present invention. Specifically, any mask geometry may be used which defines a gap that varies in a periodic manner along the optical propagation direction. Moreover, the periodicity may be constant or it may be variable. For example, FIGS. 3–5 show some other mask geometries that are contemplated by the present invention. In FIGS. 2–5 like reference numerals are used to identify like elements. FIGS. 4 and 5 show examples of mask geometries which vary in a nonconstant periodic fashion. The two strips constituting the mask do not need to be symmetric with respect to one another. For example, the mask in FIG. 2 may be modified so that only one of the two strips has a serrated edge while the other strip has a straight edge. Additionally, as FIGS. 3–5 illustrate, the mask may be configured as a series of discrete elements rather than two continuous strips. One of ordinary skill in the art will recognize that the mask geometries in FIGS. 2–5 are shown for illustrative purposes only and that the invention should in no way be construed as being limited to those particular examples.

After depositing the masks, the MQW stack 26 is grown using the SAE method. The MQW stack 26 comprises a plurality of QW layers. Each QW layer of the stack is separated by a barrier layer. Exemplary material systems that may be used for the MQW stack 26 include InGaAs/InP, InGaAsP/InP, and InGaAs/InGaAsP. As will be appreciated by those skilled in the art, many parameters will influence the characteristics of the QW material. It is well known in the art how to vary such parameters to grow QW material adapted for a particular application. For an optical waveguide the MQW stack 26 should be tailored to maximize optical confinement and provide low loss. Regarding the low loss, free carrier absorption characteristics, scattering and other loss mechanisms should be considered.

Because of the characteristics of the SAE method previously discussed, the individual QWs are thicker and have an increased indium content in those portions of the gap that are relatively narrow relative to those portions of the gap that are relatively wide. That is, for the particular mask shown in FIG. 2, the thickness and indium content of the QWs varies in a periodic manner along the entire gap 41. This variation in thickness and indium content results in a periodic variation in bandgap energy, and hence, refractive index. In the fully fabricated waveguide this periodic variation in refractive index will give rise to an optical grating.

After the MQW stack 26 has been fabricated, the mask 40 is etched away using a suitable etchant such as HF or gas phase chemical etching. The stack 26 must then be buried in a relatively low refractive index material such as InP, which serves as the cladding layer 51 of the buried heterostructure waveguide shown in FIG. 1. A current blocking layer of Fe:InP may also be used for electrical isolation when a laser is fabricated on the substrate. Details concerning these fabrication steps subsequent to the formation of the MQW stack 26 are well known and hence will not be discussed further. Such fabrication details may be found, for example, in "A Multifrequency WG laser by SAE," IEEE Phot. Tech. Lett., Vol. 6, pp.1277–1279, 1994.

An optical wave propagating through the waveguide core defined by the MQW stack 26 experiences a periodic variation in refractive index caused by the periodic variation in thickness and width of the waveguide core. Consequently, the buried heterostructure waveguide fabricated in accordance with the inventive method effectively incorporates an optical grating therein. Moreover, the waveguide, grating, and active device may now all be formed in a single plane. That is, the MQW layers of the various devices through which the optical wave propagates may all be located in a common plane. The resulting device exhibits substantially improved optical interface quality between the various components over the quality that is obtainable with known etch and regrow methods.

The optical grating fabricated in accordance with the present invention is a full two dimensional grating since light propagating through the waveguide in the z direction experiences a refractive index variation in both the x and y directions caused by the variations in thickness and width. That is, the waveguide has a refractive index profile along its longitudinal axis that periodically varies in both directions transverse to the longitudinal axis. In contrast, when an optical grating is fabricated in accordance with conventional etch and regrow techniques the refractive index varies in only one of the two transverse directions, which may be undesirable due to the resulting birefringence.

While a method for forming a buried heterostructure waveguide that incorporates an optical grating is described above, it should be understood that other waveguide configurations may be formed according to the present invention. For example, other waveguide structures that may incorporate a grating in accordance with the present invention include various strip waveguides such as raised strip, ridge-guided, and strip-loaded waveguides. Such structures are described, for example, in *Integrated Optics*, T. Tamir, ed., (Springer-Verlag 1979), pp. 62–63.

I claim:

1. A method for forming an optical grating within a waveguide integrated on a substrate, said method comprising the steps of:

depositing on a substrate successive layers of materials constituting a waveguide such that a portion of said waveguide has a periodically varying thickness and width in a direction of propagation defined by its longitudinal axis, wherein said waveguide portion has an effective refractive index profile that periodically varies in both directions transverse to said direction of propagation.

2. The method of claim 1 wherein the depositing step further comprises the step of depositing by selective area epitaxy at least some of said successive layers through a mask having a periodically varying width along at least one edge.

3. The method of claim 2 wherein said mask comprises two strips of dielectric material.

4. The method of claim 2 wherein said mask comprises a plurality of strips of dielectric material.

5. The method of claim 2 wherein certain of said successive layers deposited through said mask comprise a plurality of multiple quantum well layers separated from each other by barrier layers which collectively form a multiple quantum well stack.

6. The method of claim 5 further comprising the step of depositing on said substrate layers of material that form an active device, said active device having multiple quantum well layers located in a common plane with said multiple quantum well stack of said waveguide.

7. The method of claim 6 wherein said active device is a laser.

8. The method of claim 6 wherein said active device is of a type selected from the group consisting of a modulator, switch, tunable filter, wavelength converter, and an optical detector.

9. The method of claim 5 wherein said multiple quantum well stack is formed from a material system selected from the group consisting of InGaAs/InP, InGaAsP/InP, and InGaAs/InGaAsP.

10. The method of claim 2 wherein said waveguide is a buried heterostructure waveguide.

11. The method of claim 2 wherein said waveguide is of a type selected from the group consisting of a ridge-guided waveguide and a strip-loaded waveguide.

12. The method of claim 1 wherein said thickness and width are periodically varied according to a period that is substantially constant along the direction of propagation.

13. The method of claim 1 wherein said thickness and width are periodically varied according to a period that varies along the direction of propagation.

14. An integrated optical device comprising:

a substrate; and a waveguide formed on said substrate, at least a portion of said waveguide having multiple layers and a periodically varying thickness and width in a direction of propagation defined by its longitudinal axis such that said waveguide portion has an effective refractive index profile that periodically varies in both directions transverse to said direction of propagation.

15. The device of claim 14 wherein said thickness and width are periodically varied according to a period that varies along the direction of propagation.

16. The device of claim 14 wherein said thickness and width are periodically varied according to a period that is constant along the direction of propagation.

17. The device of claim 16 wherein said width varies in a serrated manner.

18. The device of claim 14 wherein said multiple layers are a buried heterostructure.

19. The device of claim 14 wherein said waveguide is of a type selected from the group consisting of a ridge-guided waveguide and a strip-loaded waveguide.

20. The device of claim 14 further comprising an active device formed on said substrate, said active device being located in a common plane with said waveguide.

21. The device of claim 20 wherein said active device is of a type selected from the group consisting of a laser, modulator, switch, tunable filter, wavelength converter, and an optical detector.

22. The device of claim 21 wherein said waveguide and active device each have a multiple quantum well stack of material located in a common plane, said multiple quantum well material being selected from the material systems consisting of InGaAsfInP, InGaAsP/InP, and InGaAs/InGaAsP.

23. The device of claim 14 wherein said multiple layers is a core formed from a multiple quantum well stack.

24. The device of claim 23 wherein said multiple quantum well stack is formed from a material system selected from the group consisting of lnGaAs/lnP, lnGaAsP/lnP, and lnGaAs/lnGaAsP.

25. A method for forming an optical grating within a waveguide integrated on a semiconductor substrate, comprising the steps of:

(a) depositing a mask comprising at least two strips spaced to form a gap having a portion with a periodically varying width;

(b) depositing a multiple quantum well material suitable for forming passive waveguides;

(c) removing the mask so that deposited multiple quantum well material has a width that varies in the same manner as the gap; and (d) depositing a material having a refractive index less than the refractive index of the multiple quantum well material to serve as a waveguide cladding.

26. A method for forming an optical grating within a waveguide integrated on a substrate, said method comprising the steps of:

depositing on a substrate successive layers of materials constituting a waveguide such that said waveguide has a core having a periodically varying thickness, width, and composition along a portion of its longitudinal axis.

27. The method of claim 26 wherein said waveguide has a refractive index profile along said longitudinal axis that periodically varies in both directions transverse to said longitudinal axis.

28. The method of claim 26, wherein said depositing step includes growing at least some of said successive layers by selective area epitaxy through a mask having a periodically varying width along at least one edge.

29. The method of claim 28, wherein said depositing step includes growing through the mask a plurality of multiple quantum well layers separated from each other by barrier layers to collectively form a multiple quantum well stack.

30. The method of claim 29, further comprising a step of depositing on the substrate layers of material that form an active device, said active device having multiple quantum well layers located in a common plane with said multiple quantum well stack of said waveguide.

31. An integrated optical device comprising:

a substrate; and a waveguide formed on said substrate, said waveguide having a periodically varying thickness, width, and composition along a portion of its longitudinal axis.

32. The device of claim 31 wherein said waveguide has a refractive index profile along said longitudinal axis that periodically varies in both directions transverse to said longitudinal axis.

33. The device of claim 31, wherein said periodically varying thickness and width has a period that is constant along said portion of its longitudinal axis.

34. The device of claim 31, further comprising an active device formed on said substrate, said active device being located in a common plane with said waveguide.

35. The device of claim 34, wherein said active device is of a type selected from the group consisting of a laser, modulator, switch, tunable filter, wavelength converter, and an optical detector.

36. A method for forming an optical grating within a waveguide integrated on a substrate, said method comprising the steps of:

depositing on a substrate, by selective area epitaxy through a mask having a periodically varying thickness and width along at least one edge, successive layers of materials constituting a waveguide having a periodically varying thickness and width in a direction of propagation, wherein certain of said successive layers deposited during said depositing step form a multiple quantum well stack.

37. The method of claim 36, further comprising a step of depositing on said substrate layers of material that form an active device, said active device having multiple quantum well layers located in a common plane with said multiple quantum well stack of said waveguide.

38. An integrated optical device comprising:

a substrate; and a buried heterostructure waveguide formed on said substrate, said buried heterostructure waveguide having a periodically varying thickness and width along a portion of its longitudinal axis.

39. An integrated optical device comprising:

a substrate;

a waveguide formed on said substrate, said waveguide having multiple layers and a periodically varying thickness and width along a portion of its longitudinal axis; and an active device selected from the group consisting of a laser, modulator, switch, tunable filter, wavelength converter, and an optical detector.

* * * * *